Figure 1:
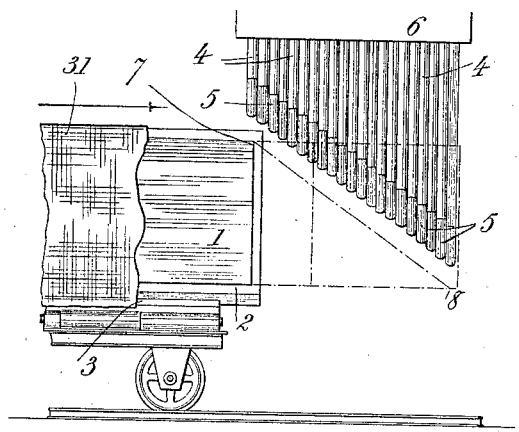

E. LANHOFFER.
APPARATUS FOR PRESSING OR MOLDING LAYERS OF AGGLOMERATED FIBROUS MATERIAL.
APPLICATION FILED MAR. 26, 1913.

1,088,350.

Patented Feb. 24, 1914.
2 SHEETS—SHEET 1.

Witnesses:
Hyperion Barry.
F. George Barry

Inventor:
Edmund Lanhoffer
by his attorneys
Brown Seward

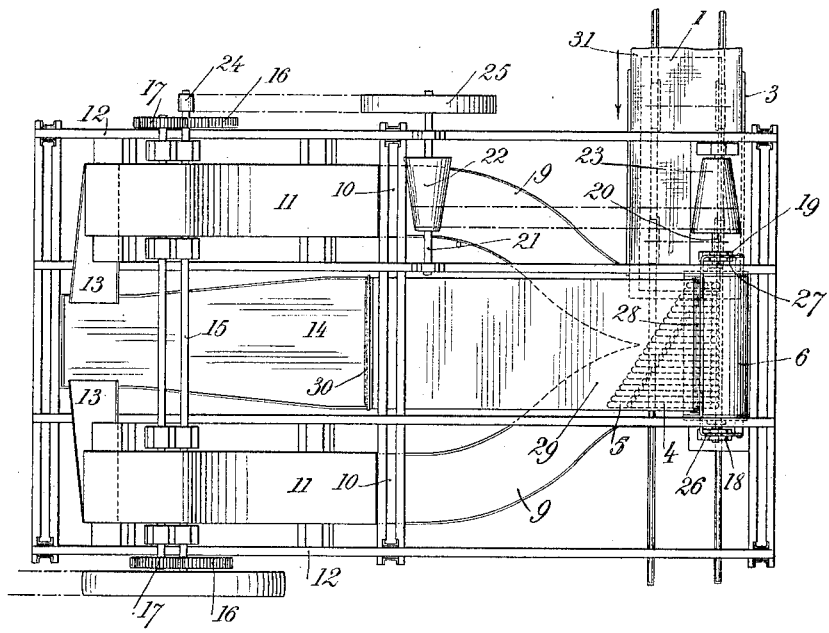
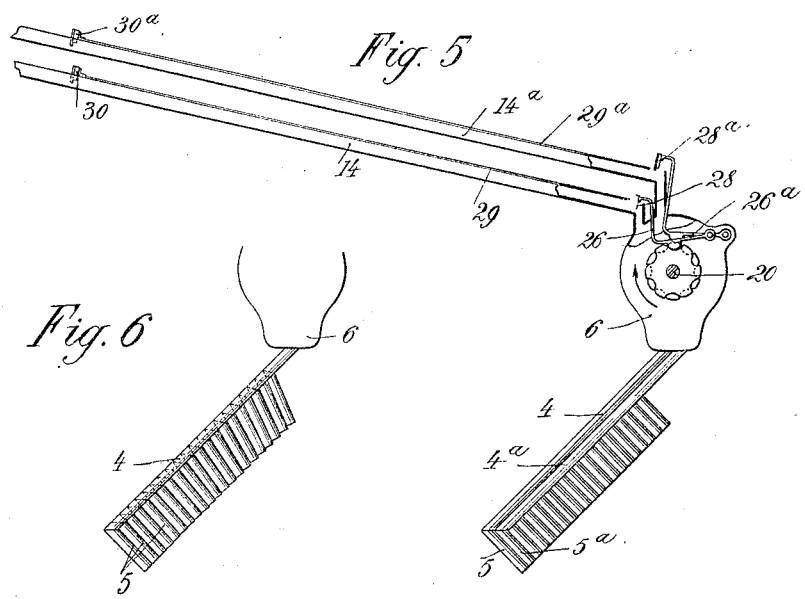

UNITED STATES PATENT OFFICE.

EDMOND LANHOFFER, OF POISSY, FRANCE.

APPARATUS FOR PRESSING OR MOLDING LAYERS OF AGGLOMERATED FIBROUS MATERIAL.

1,088,350.	Specification of Letters Patent.	Patented Feb. 24, 1914.

Application filed March 26, 1913. Serial No. 756,880.

*To all whom it may concern:*

Be it known that I, EDMOND LANHOFFER, citizen of the Republic of France, and resident of No. 2 Boulevard de Maisons, Poissy, in the Department of Siene and Oise, in the said Republic, engineer, have invented a new and useful Apparatus for Pressing or Molding Layers of Agglomerated Fibrous Material, of which the following is a specification.

The invention relates to apparatus for the production of reliefs and hollows upon plates, sheets, or layers, of carton-pierre composed of fibrous materials and hydraulic cement or other agglomerants, for ornamental or other purposes.

The object of the invention is to dispense with the employment of a counter matrix or die and cause the material to penetrate into all the hollows of the mold or matrix, any breaks or tears produced being automatically repaired, the operation being carried out in a more perfect manner than could be accomplished by hand. This apparatus works according to the method in respect of which on March 25, 1913, I filed an application for Letters Patent Serial No. 756,834 and which consists in effecting the pressing or molding of the material by ramming or beating it in a matrix, upon which the plate or layer is placed, by means of shocks produced at all points by a number of bodies possessing a suitable active force and projected in a shower upon the material. The bodies employed in the apparatus are solid bodies having the form of balls of metal or other hard material the maximum dimensions of which can vary according to circumstances and which are preferably not all of the same diameter but comprise large and small balls mixed.

The general arrangement of the apparatus consists in placing a matrix, upon which is laid the plate, sheet or layer of agglomerated fibrous material, upon a carriage to which a continuous movement is given. During the movement a shower of balls is constantly projected upon the plate or layer and in this way successive zones come opposite a series of nozzles the orifices of which are disposed along an oblique line extending over the whole of the width of the apparatus. These nozzles are fed by a reservoir which in turn is fed by a floor, or several superposed floors, on to which the balls, after having exercised their action upon the plate, sheet or layer, are returned and uniformly distributed or spread.

By accomplishing the pressing or molding of parallel successive zones, the formation of folds or wrinkles upon the plate or layer, due to the extension of the material under the action of the shocks, is avoided. Moreover, the arrangement permits of keeping the dimensions of the apparatus small, because, owing to the longitudinal displacement of the plate or layer the width given to the apparatus is only determined by the width or height of the plate or layer, the length of which latter is immaterial.

The matrix and the plate or layer thereon are preferably inclined and the degree of inclination is increased, that is to say, the mold more nearly approaches the vertical, when a mold with hollows of increased depth is used, in order that the balls which strike the material shall not remain in these hollows and that in running down, they shall not exercise upon the plate, sheet or layer, a certain degree of rolling which would be objectionable.

The apparatus according to this invention is described in detail with reference to the accompanying drawings in which:—

Figure 2:
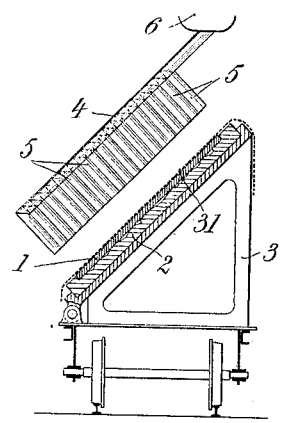
Figure 3:
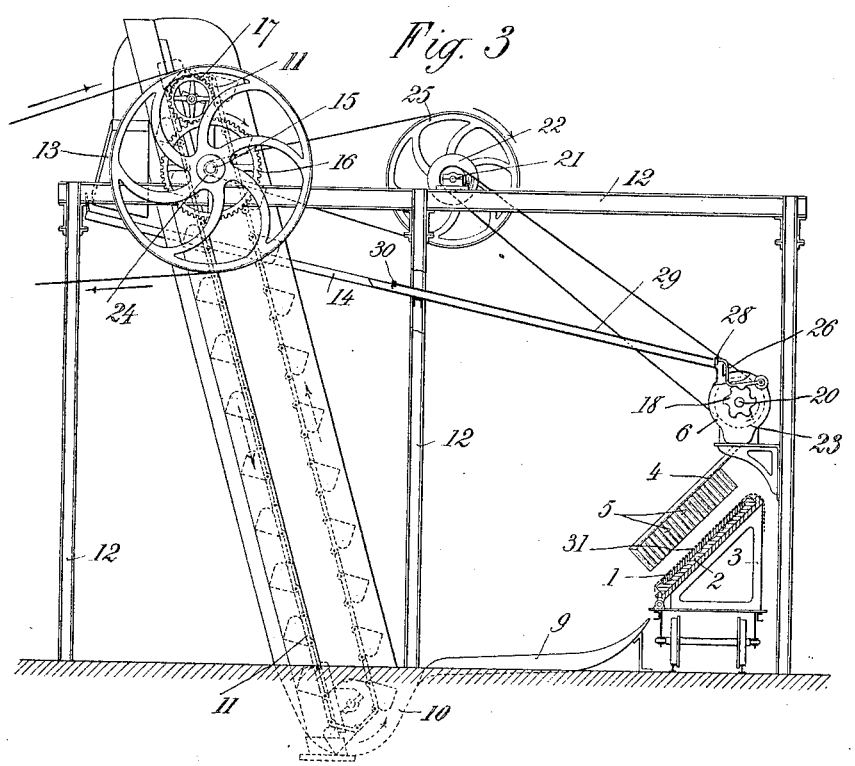

Figure 1 is a side elevation of the carriage with the matrix and the material to be pressed thereon and of the nozzles which project the balls on to the material. Fig. 2 is partly an end elevation and partly a cross section of the structure shown in Fig. 1; Fig. 3 is a side elevation partly in cross section of a complete apparatus; Fig. 4 is a plan of structure shown in Fig. 3, Fig. 5 is a side elevation partly in section illustrating a modification in which two series of nozzles are employed for projecting the balls, instead of only one series, and Fig. 6 illustrates a modified construction of the nozzle device.

In Figs. 1 and 2, 1 designates the sheet or layer of carton-pierre which is not yet dry so that it is capable of being pressed or stamped; it is placed upon the mold or matrix 2 supported in an inclined position by the carriage 3 which is movable in relation to a range of nozzles 5 connected by tubes 4 to a reservoir 6 containing balls which pass through these tubes and through the nozzles 5 and are projected in a shower against the sheet 1.

The orifices of the nozzles 5 are situated at graduated heights in such manner as to form an oblique line the extremities of which are respectively at the height of the upper edge and at the height of the lower edge of the sheet in such manner that the sheet is struck at one and the same time over the whole of its width by the balls which fall upon a line which is displaced parallel to itself upon the sheet according to the travel of the carriage 3 in front of the apparatus. At the commencement of the operation the extremity of the plate, sheet or layer is at 7 in Fig. 1 and its upper angle only is struck by the balls, then the line or zone of attack is gradually increased in length as the sheet advances and from the moment when the forward edge of the sheet or layer arrives at 8 it is operated upon over the whole of its width. Before the operation the sheet may be covered with a fabric 31.

The carriage 3 instead of being in front of the series of nozzles can be arranged beneath and in this case the tubes 4 and 5 would not need to be angularly disposed. Moreover the line of attack could be perpendicular to the length of the sheet instead of being oblique.

When the balls fall to the ground they are guided by two ducts 9, 9 descending into two little pits 10, 10 where the balls are taken up by chain bucket conveyers 11, 11 arranged at respective sides of the framing 12 of the machine which deliver into chutes 13, 13 delivering on to an inclined table 14 at the bottom of which is the transverse hopper or reservoir 6 above mentioned from which the tubes proceed. The chain bucket conveyers are driven by the main shaft 15 through the medium of gear wheels 16, 16 and 17, 17. In order to regulate the shower of balls, which is an important feature, the balls are not allowed constant free access into the reservoir 6 but are periodically arrested at the bottom of the inclined table 14 by a shutter 28 formed by a metal bar carrying a band of thick india rubber. This shutter is alternately raised and lowered, which movement is imparted to it by two cams 18 and 19 carried by a shaft 20 which is driven by a shaft 21 by means of pulleys 22 and 23 connected by a belt and the shaft 21 is driven from the main shaft 15 by means of pulleys 24 and 25 and a belt. The cams 18 and 19 operate upon the bent levers 26 and 27 to which are respectively attached the two extremities of the shutter 28. This arrangement which alternately opens and closes the passage for the balls has for object to distribute them uniformly over the width of the table of the machine in order to avoid accumulation of the balls in the neighborhood of one point. However, even this arrangement would not insure sufficient regularity if the balls had a free course over the whole length of the table, consequently the table 14 is furnished with a cover 29 and at the entrance is arranged a stationary transverse rule 30 covered with india rubber, like the shutter 28, and leaving beneath it a passage only a little greater in height than the diameter of the biggest ball. This rule produces a preliminary distribution of the balls which in conjunction with the action of the shutter 28 insures the uniform delivery.

In the modification illustrated in Fig. 5, instead of a single series of tubes and nozzles for projecting the balls, there are two series 4, 4$^a$ and 5, 5$^a$ alongside one another in such manner as to duplicate the action of the balls upon the sheet. They are fed by two independent inclined tables 14 and 14$^a$ each furnished with a cover 29, 29$^a$, with a fixed rule 30, 30$^a$, and with a shutter 28, 28$^a$. These shutters are operated by cams mounted on the shaft 20 in the same manner as above described, care being taken that the movements of the one shutter are the opposite to those of the other shutter. That is to say, when for example, the shutter of the table 14 is lowered that of the table 14$^a$ is on the contrary raised as seen in Fig. 5. Cams operate upon the bent levers 26, 26$^a$.

Instead of employing the means which have been described for destributing or spreading the balls upon one or more tables it is possible to obtain this result by giving an oscillatory movement to the tables similar to that of sieves or plane sifters employed in flour mills.

In order to prevent the balls which strike the sheet or layer at the lower part from having a greater speed, by reason of their greater fall, than that of the balls which strike the higher part this is readily accomplished by giving the various nozzles 5 different inclinations as shown in the detail view in Fig. 6, in order to compensate the acceleration which is produced in the passage through the tubes 4 of unequal length.

As has been already stated the balls employed in the machine are preferably of metal or other hard material. Their diameter can vary and it is also advantageous to make balls of a large number of varieties, taking as a maximum diameter about 15 to 20 millimeters and as a minimum diameter a dimension less than one half for example, experience showing that in these conditions a faithful reproduction of the mold is obtained.

What I claim is:—

1. Molding apparatus comprising in combination a support for the material to be molded, a distributer for delivering a shower of relatively small bodies over said support, and traversing means operative to produce relative movement between said support and said distributer.

2. Molding apparatus comprising in combination a matrix for the material to be molded, a distributer for delivering a shower of relatively small bodies over said matrix, said distributer comprising nozzles directed about perpendicularly to the plane containing the exposed surface of material in said matrix, and traversing means operative to produce relative movement between said support and said distributer.

3. Molding apparatus comprising in combination a matrix, a range of nozzles over said matrix, said range extending from side to side of said matrix, means for supplying said nozzles with relatively small bodies which are delivered by said nozzles in the form of a shower on to said matrix, and traversing means operative to produce relative movement between said range of nozzles and said matrix.

4. Molding apparatus comprising in combination a matrix, a range of nozzles over said matrix and extending obliquely from side to side thereof, means for supplying said nozzles with relatively small bodies which are delivered by said nozzles in the form of a shower on to said matrix, and traversing means operative to produce relative movement between said range of nozzles and said matrix in the direction of the length of said matrix.

5. Molding apparatus comprising in combination a matrix, an inclined plane support for said matrix, a range of nozzles over said matrix and extending obliquely from side to side thereof the orifices of said nozzles being contained in a plane about parallel with the plane of said inclined support, means for supplying said nozzles with relatively small bodies which are delivered by said nozzles in the form of a shower on to said matrix, and traversing means operative to produce relative movement between said range of nozzles and said matrix in the direction of the length of said matrix.

6. Molding apparatus comprising in combination a matrix, a range of nozzles over said matrix, supply means connected with said nozzles for feeding relatively small bodies thereto, an elevator guiding means for conducting the bodies falling from said matrix to the elevator, and conducting means for leading the bodies delivered by said elevator to said supply means.

7. Molding apparatus comprising in combination a matrix, an inclined support therefor, an inclined range of nozzles over said matrix, supply means connected with said nozzles for feeding relatively small bodies thereto, an elevator, guiding means for conducting the bodies falling from said matrix to the elevator, conducting means for leading bodies delivered by said elevator to said supply means, and traversing means operative to produce relative movement between said range of nozzles and said matrix in the direction of the length of said matrix.

8. Apparatus for molding layers of agglomerated fibrous material comprising a floor upon which balls are distributed; tubes at the delivery end of said floor in which tubes the balls fall under their own weight; nozzles at the lower extremity of these tubes for the exit of the balls; a carriage, means for giving to the carriage traveling movement; and a matrix carried upon the said carriage.

9. Apparatus for molding layers of agglomerated fibrous material, comprising a floor upon which balls are distributed; a reservoir into which the balls fall from said floor; an intermittently operating shutter permitting the balls to fall from said floor at short intervals; tubes in which the balls fall from the reservoir freely and continuously; nozzles at the lower extremities of these tubes for the exit of the balls; a carriage; means for giving traveling movement to the carriage; and a matrix carried upon the said carriage.

10. Apparatus for molding layers of agglomerated fibrous material comprising a floor upon which the balls are distributed; a cover extending over a portion of the length of the floor; a strip arranged at the forward part of the cover for distributing the balls upon the floor; tubes at the delivery end of said floor in which tubes the balls fall by their own weight; nozzles at the lower extremities of said tubes for the exit of the balls; means for giving a traveling movement to the carriage; and a matrix carried upon the said carriage.

11. Apparatus for molding layers of agglomerated fibrous material comprising a floor upon which balls are distributed; a reservoir arranged at the extremity of the floor, an intermittently operated shutter for intermittently interrupting the communication between said floor and said reservoir; levers attached by one of their extremities to the said shutter; cams operative upon said levers to raise the latter and open said shutter for allowing of the passage of the said balls; tubes connected with said reservoir in which tubes the balls fall freely and continuously from the reservoir; nozzles at the extremities of these tubes for the exit of the balls; a carriage; means for giving a traveling movement to the carriage, and a matrix carried upon the said carriage.

12. Apparatus for molding layers of agglomerated fibrous material, comprising superposed and inclined floors, ball distributers in connection with said floors; a shutter arranged at the lower end of each one of the floors for opening or closing the entrance passage of the balls; shutter operating means for opening one of the said shutters while the other is closed; tubes for receiving balls from said floor; nozzles at the extremities of the said tubes for the exit of the said balls; a carriage; means for giving a traveling motion to the carriage; and a matrix carried upon the said carriage.

13. Apparatus for molding layers of agglomerated or fibrous material comprising a floor; ball distributing means in connection with said floor; two ball collecting pits; bucket chain conveyers for lifting the balls from the said pits and delivering them upon the said floor; tubes for receiving balls from said floor in which tubes the balls fall by their own weight; nozzles at the lower extremities of the said tubes for the exit of the balls; means for giving a traveling movement to the carriage; a matrix carried upon the said carriage, and channels leading to said pits for receiving balls falling from said matrix and to deliver same to said pits.

14. Apparatus for molding layers of agglomerated fibrous material comprising two inclined floors; ball distributers in connection with said floors and comprising covers extending partially over these floors, and strips placed at the upper parts of said covers for effecting the distribution of the balls over said floors; a shutter arranged at the lower extremity of each of the said floors; levers operatively connected with said shutters; cams acting upon the levers alternately in such manner that one shutter is open when the other is closed; two reservoirs for receiving balls coming from respective floors; tubes connected with the reservoirs in which tubes the balls fall freely and continuously from the reservoirs; nozzles at the lower extremities of the said tubes, said nozzles being ranged in an oblique line which extends from one side to the other of the apparatus; a carriage; means for giving traveling movement to the said carriage; a matrix carried upon the said carriage; two channels in which the balls fall after striking a layer of agglomerated fibrous material on said matrix; two pits at the extremities of respective channels; two bucket chain conveyers for lifting the balls from the said pits, and a pair of chutes upon which the balls are delivered by the conveyers and which conduct the balls on to the said floors.

In testimony. that I claim the foregoing as my invention, I have signed my name in presence of two witnesses, this twelfth day of March, 1913.

EDMOND LANHOFFER.

Witnesses:
 LUCIEN MEMMENGER,
 ALCIDS FABE.

---

Copies of this patent may be obtained for five cents each, by addressing the "Commissioner of Patents, Washington, D. C."